UNITED STATES PATENT OFFICE.

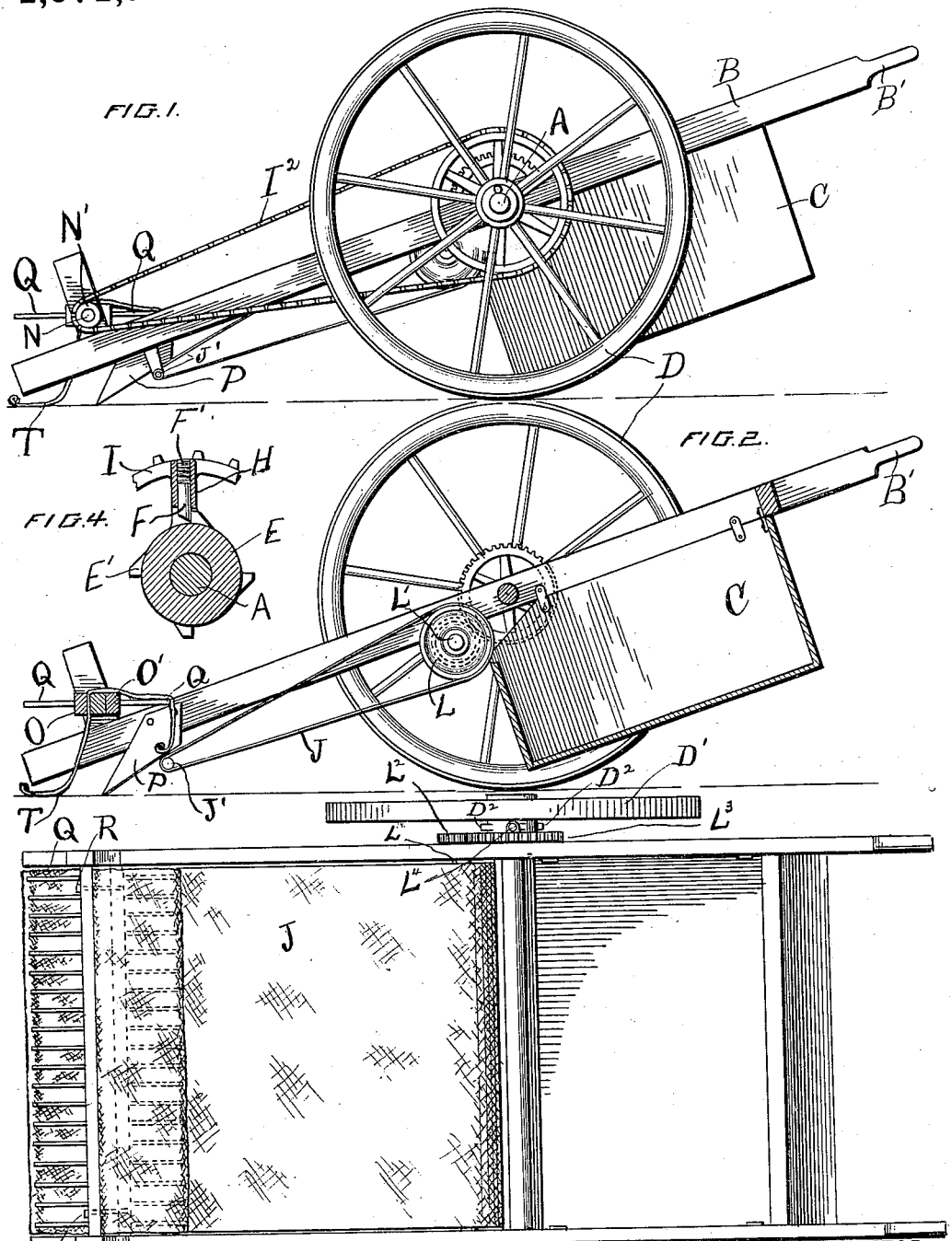

RICHARD WYLIE, OF NAPA, CALIFORNIA.

BROOM-SCOOP COLLECTOR.

1,071,494.  Specification of Letters Patent.  Patented Aug. 26, 1913.

Application filed January 13, 1913. Serial No. 741,867.

*To all whom it may concern:*

Be it known that I, RICHARD WYLIE, a citizen of the United States, residing at Napa, in the county of Napa and State of California, have invented certain new and useful Improvements in Broom-Scoop Collectors; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in automatic broom scoop for collecting debris, etc., from surfaces of streets, etc., and comprises a simple and efficient apparatus of this nature having various details of construction and combinations and arrangements of parts which will be hereinafter fully described, shown in the accompanying drawings and then specifically defined in the appended claim.

I illustrate my invention in the accompanying drawings, in which:—

Figure 1 is a side elevation of my invention. Fig. 2 is a central vertical sectional view, Fig. 3 is a top plan view and Fig. 4 is a detail sectional view showing the spring-pressed pawl and hub with teeth engaged by the pawl.

Reference now being had to the details of the drawings by letter, A designates an axle mounted upon the frame B, which latter has handles B' and a soil receptacle C depending therefrom. Wheels D and D' are loosely journaled upon said shaft, and E designates the hub of the wheel having teeth E' upon the circumference thereof adapted to be engaged by a pawl F which is held in the path of the teeth by a coiled spring F', as shown clearly in Fig. 4 of the drawings. The pawl F is movable within a guide shell H integral with the sprocket wheel I. It will be noted that said pawl and the teeth upon the hub are so arranged that, when the wheel of which the hub is an integral part rotates in the forward direction, the pawl will contact with a tooth and cause the sprocket wheel to rotate with the hub but, on a reverse rotary movement to the wheels D, the inclined edges of the teeth will strike the inclined edge of the pawl and cause the same to be retracted under the tension of the spring and therefore the sprocket wheel will remain at rest. In the forward lower end of the frame is journaled a rotatable shaft N having cross-pieces O and O' fastened thereto and which are provided with teeth Q parallel to one another, said strips being held together in any suitable manner as by means of bolts R, shown clearly in Fig. 3 of the drawings. Said cross-pieces O securely clamp the pliable wiping member T, made of felt, canvas or any other suitable material. A scoop, designated by letter P, is fastened to the sides of the frame, as shown clearly in Fig. 2 of the drawings, and against the inclined bottom of which said flaps are adapted to contact as they brush the soil from the surface being swept. A sprocket wheel N' is fitted to the shaft N and about which and the sprocket wheel I a sprocket chain $I^2$ passes.

An endless conveyer band, designated by letter J, passes about a roller J' at one end and a drum L has a spindle end L' to which a gear wheel $L^2$ is fixed and which is in mesh with a pinion wheel $L^3$ fastened to the hub of the wheel D'.

The operation of my invention will be readily understood and is as follows:—The parts being adjusted as shown in the drawings and pushed forward, a rotary movement will be imparted through the sprocket chain connections between the sprocket wheels I, the rake teeth serving to cause any large particles of matter gathered up to be pushed up the scoop and cause the pliable flap to wipe against the bottom of the scoop and push the soil back upon the conveyer where it will be elevated and dumped into the soil receptacle C. In the event of the wheels D and E of the apparatus turning in a reverse direction, it will be noted that the spring-pressed pawls will turn idly, causing the endless conveyer and the sprocket chain to remain at rest.

What I claim to be new is:—

In combination with a truck having a rotatable shaft, a scoop fastened to the frame of the apparatus, a rotatable shaft mounted in suitable bearings, cross-pieces fastened to said shaft and provided with laterally extending teeth, a pliable wiping member interposed between one of said cross-pieces and shaft to which it is attached and adapted to be moved by said fingers against the bottom of the scoop.

In testimony whereof I hereunto affix my signature in the presence of two witnesses.

RICHARD WYLIE.

Witnesses:
M. STOCKMON,
W. BOKE.